(12) United States Patent
Swane (10) Patent No.: US 9,452,580 B2
(45) Date of Patent: Sep. 27, 2016

(54) CAP RETAINER AND A PULLEY ASSEMBLY INCLUDING THE CAP RETAINER AND METHOD OF ASSEMBLY

(71) Applicant: Jeffrey A. Swane, Nixa, MO (US)

(72) Inventor: Jeffrey A. Swane, Nixa, MO (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 0 days.

(21) Appl. No.: 14/612,383

(22) Filed: Feb. 3, 2015

(65) Prior Publication Data

US 2015/0145167 A1 May 28, 2015

Related U.S. Application Data

(62) Division of application No. 12/566,088, filed on Sep. 24, 2009, now Pat. No. 8,979,686.

(51) Int. Cl.
| | |
|---|---|
| *B62J 13/00* | (2006.01) |
| *F16D 1/00* | (2006.01) |
| *F16H 57/02* | (2012.01) |
| *F16C 33/76* | (2006.01) |
| *B29D 99/00* | (2010.01) |
| *B29C 45/14* | (2006.01) |
| *F16C 33/72* | (2006.01) |
| *F16H 55/48* | (2006.01) |
| *F16C 13/00* | (2006.01) |

(Continued)

(52) U.S. Cl.
CPC ..... *B29D 99/0032* (2013.01); *B29C 45/14467* (2013.01); *F16C 13/006* (2013.01); *F16C 33/723* (2013.01); *F16H 55/48* (2013.01); *B29K 2101/00* (2013.01); *B29L 2031/32* (2013.01); *F16C 2361/63* (2013.01)

(58) Field of Classification Search
CPC .... F16C 33/723; F16C 16/006; F16C 33/76; F16C 2326/02; B60B 27/0005
USPC .......................................... 474/144; 384/489
See application file for complete search history.

(56) References Cited

U.S. PATENT DOCUMENTS

| 665,569 | A | * | 1/1901 | Little | F16C 35/073 16/DIG. 27 |
|---|---|---|---|---|---|
| 1,096,805 | A | * | 5/1914 | Gohlke | F16C 33/723 384/489 |
| 1,206,505 | A | * | 11/1916 | Blume | F16C 25/06 14/36 |

(Continued)

OTHER PUBLICATIONS

PCT, International Search Report and Written Opinion, PCT/US2010/049082 (Nov. 5, 2010).

(Continued)

*Primary Examiner* — Henry Liu
(74) *Attorney, Agent, or Firm* — Thompson Hine LLP (57) ABSTRACT

An insert moldable cap retainer for securing a bearing cap to a pulley assembly is disclosed. The cap retainer includes a hollow neck configured to receive a bearing cap, a plate that extends outward from the neck with the neck protruding upward from the plate, and a continuous or discontinuous flange extending downward from the outer periphery of the plate. The plate is configured to be juxtaposed with an upper surface of an outer race of a bearing and the flange is configured to be juxtaposed with an outer surface of the outer race of the bearing when the cap retainer is positioned on the bearing. The cap retainer and bearing are insert moldable together to have an integral pulley body connected thereto. A pulley assembly is also disclosed that includes the insert moldable cap retainer.

4 Claims, 12 Drawing Sheets

(51) Int. Cl.
    *B29L 31/32*    (2006.01)
    *B29K 101/00*    (2006.01)

(56) References Cited

U.S. PATENT DOCUMENTS

| | | | | |
|---|---|---|---|---|
| 1,603,596 A * | 10/1926 | Harley | B60B 27/023 | 384/480 |
| 1,693,538 A * | 11/1928 | Allen | F16B 37/00 | 384/489 |
| 1,875,097 A * | 8/1932 | Mitchell | F16C 33/6607 | 384/487 |
| 2,044,380 A * | 6/1936 | Cobb | F16C 33/723 | 384/488 |
| 2,221,553 A * | 11/1940 | Okun | B60B 27/0005 | 277/369 |
| 2,266,300 A * | 12/1941 | Bebinger | F16C 33/78 | 384/489 |
| 2,512,148 A * | 6/1950 | Gaines | B60B 27/001 | 16/46 |
| 2,622,934 A * | 12/1952 | Phelps | B60B 27/02 | 301/105.1 |
| 2,622,944 A * | 12/1952 | Bergstrom | F16C 19/36 | 384/489 |
| 2,717,808 A * | 9/1955 | Owsen | A63C 17/02 | 152/47 |
| 2,759,243 A * | 8/1956 | Smith | F16C 25/06 | 29/441.1 |
| 3,010,771 A * | 11/1961 | Cogger | B60B 27/0005 | 277/369 |
| 3,126,232 A * | 3/1964 | Reilly | B60B 7/00 | 301/108.1 |
| 3,169,809 A * | 2/1965 | Pendleton | B60B 7/002 | 277/402 |
| 3,330,563 A * | 7/1967 | De Puydt | B60P 3/10 | 277/346 |
| 3,460,437 A * | 8/1969 | Roggenburk | F01C 21/02 | 384/489 |
| 3,460,874 A * | 8/1969 | Johnson | B60B 7/002 | 277/572 |
| 3,537,725 A | 11/1970 | Frost | | |
| 3,577,833 A * | 5/1971 | Skelton | F16J 10/02 | 277/530 |
| 3,770,992 A * | 11/1973 | Veglia | F16C 33/723 | 384/489 |
| 4,025,132 A * | 5/1977 | Watanabe | F16C 13/006 | 384/130 |
| 4,054,335 A * | 10/1977 | Timmer | A63C 17/223 | 16/46 |
| 4,113,328 A | 9/1978 | VanderMeulen | | |
| 4,230,230 A * | 10/1980 | Mumford | B65D 41/62 | 215/277 |
| 4,342,490 A * | 8/1982 | Swinley | F16C 33/723 | 384/489 |
| 4,364,614 A * | 12/1982 | Weis | F16C 33/723 | 220/285 |
| 4,368,933 A * | 1/1983 | Motsch | F16C 33/723 | 384/130 |
| 4,793,457 A | 12/1988 | Siewert | | |
| 4,960,335 A * | 10/1990 | Otto | F16C 19/386 | 277/562 |
| 5,172,984 A * | 12/1992 | Lederman | B60B 7/002 | 384/489 |
| 5,190,502 A | 3/1993 | Gardner et al. | | |
| 5,380,103 A * | 1/1995 | Lederman | B60B 7/002 | 301/108.3 |
| 5,590,968 A * | 1/1997 | Dretzka | F16C 35/067 | 384/272 |
| 5,620,385 A | 4/1997 | Cascionale et al. | | |
| 5,678,934 A * | 10/1997 | Fischer | F16C 23/084 | 384/489 |
| 5,711,393 A | 1/1998 | Gage | | |
| 5,711,617 A * | 1/1998 | Scheller | F16C 23/084 | 384/484 |
| 5,711,618 A * | 1/1998 | Waskiewicz | F16C 23/084 | 384/489 |
| 5,798,589 A | 8/1998 | Ohi et al. | | |
| 5,947,612 A * | 9/1999 | Dennison Buck | F16C 35/077 | 384/484 |
| 6,149,244 A * | 11/2000 | Wagner | B60B 27/001 | 29/898.07 |
| 6,435,722 B1 * | 8/2002 | Horng | F16C 33/10 | 384/135 |
| 6,485,185 B1 * | 11/2002 | Conway, Jr. | F16C 19/364 | 384/480 |
| 6,854,893 B2 * | 2/2005 | Schmidt | F16C 13/006 | 384/477 |
| 6,863,631 B2 | 3/2005 | Meckstroth et al. | | |
| 6,872,005 B2 * | 3/2005 | Steinebach | F16C 35/045 | 384/489 |
| 7,011,221 B2 | 3/2006 | Smith et al. | | |
| 7,011,593 B2 * | 3/2006 | Schenk | F16C 13/006 | 384/477 |
| 7,448,807 B2 * | 11/2008 | Schenk | F16C 13/006 | 384/417 |
| 8,012,053 B2 * | 9/2011 | Filip | F16C 13/006 | 474/144 |
| 2002/0102039 A1 * | 8/2002 | Horng | F16C 33/10 | 384/279 |
| 2003/0039422 A1 * | 2/2003 | Nisley | F16C 33/76 | 384/477 |
| 2006/0160647 A1 | 7/2006 | Swane | | |
| 2007/0072714 A1 | 3/2007 | Filip | | |

OTHER PUBLICATIONS

US, Office Action, U.S. Appl. No. 12/566,088 (Mar. 27, 2012).
US, Office Action, U.S. Appl. No. 12/566,088 (Aug. 15, 2012).
US, Advisory Action, U.S. Appl. No. 12/566,088 (Nov. 20, 2012).
US, Office Action, U.S. Appl. No. 12/566,088 (Apr. 8, 2014).
US, Office Action, U.S. Appl. No. 12/566,088 (Jul. 31, 2014).
US, Advisory Action, U.S. Appl. No. 12/566,088 (Oct. 9, 2014).
US, Notice of Allowance, U.S. Appl. No. 12/566,088 (Nov. 7, 2014).

* cited by examiner

CAP RETAINER AND A PULLEY ASSEMBLY INCLUDING THE CAP RETAINER AND METHOD OF ASSEMBLY

This is a divisional application of application Ser. No. 12/566,088 filed Sep. 24, 2009.

TECHNICAL FIELD

The present invention relates generally to a pulley assembly having a cap retainer for retaining a bearing cap to protect an exposed side of a bearing from contaminants, and more particularly to an insert moldable cap retainer.

BACKGROUND

Pulleys such as drive pulleys (both front-side and back-side), idler pulleys, tensioner pulleys, and the like are frequently employed for automotive use, e.g. to drive or tension a belt of a drive system. The belt drive system can be accomplished by using a driver pulley and one or more idler pulleys and a belt trained around the belt surface of each of the various pulleys. The belt surface may be, for example, smooth, deep V-shaped, cogged or multi-ribbed.

In such automotive and other industrial applications, contaminants such as dust, sand, salt, and/or other foreign matter can find a way into the pulley's bearing. Bearings wear more quickly when left open to contaminants, thereby reducing the lifespan of the bearing. Contaminants can also cause the ball or rolling element to seize up, which is a serious problem. Seizing can cause the driving belt to break as a result of the belt sliding on a locked pulley.

A bearing seal is a first line of defense against contaminants, but is often not enough. Various sealing rings or covers to reduce the amount of dirt and other contaminants like those described in U.S. Pat. No. 3,537,725, No. 4,113,328, and No. 7,011,593 have been attempted. Some bearing caps have been designed to attach directly to the pulley or pulley body, for example the snap-on bearing cap described in U.S. Pat. No. 4,793,457 and the flanged bearing cap grooved bearing cap retainer combination described in U.S. Published Patent Application 2007/0072714. The aforementioned pulley-bearing cap designs are not ideal, especially for injection molded pulley assemblies.

Injection molding is a well-known technique for forming pulley assemblies. However, the molds place limits on the complexity of the pulley body's design. Particularly, complex features for attaching a bearing cap to the pulley body, for example snap-fit configurations, are difficult to achieve due to the complexity of the under cuts required to form such features within the mold.

Accordingly, a new design for retaining a bearing cap on a pulley is needed that does not increase the complexity of the pulley body's design and accordingly the design of the mold used to form the pulley body.

SUMMARY

One aspect of the disclosed invention is an insert moldable cap retainer for securing a bearing cap to a pulley assembly. The insert moldable cap retainer includes a hollow neck configured to receive a bearing cap, a plate extending outward from the neck with the neck protruding from the plate, and a continuous or discontinuous flange extending downward from the outer periphery of the plate. The hollow neck defines an opening allowing access to the bearing and the fastener connecting the pulley to a mounting base. The plate is configured to be juxtaposed with an upper surface of an outer race of a bearing and the flange is configured to be juxtaposed with an outer surface of the outer race of the bearing. The cap retainer is insert-moldable with the bearing to have a pulley body molded integrally to the cap retainer and the bearing.

In another aspect, a pulley assembly including the insert moldable cap retainer is disclosed. The pulley includes a bearing that includes an inner race, an outer race, and a rolling element between the inner race and the outer race, a cap retainer having a hollow neck configured to receive a bearing cap and a plate extending outward from the neck with the neck protruding upward from the plate, and an injection molded pulley body integrally molded to the bearing and the cap retainer. The plate is configured to be juxtaposed with the upper surface of the outer race of the bearing and the cap retainer is positioned on the bearing with the plate juxtaposed with the upper surface of the outer race.

In another aspect a pulley assembly including a mounting base and a pulley having the insert moldable cap retainer is disclosed. The mounting base defines an axis of rotation and the pulley is mounted on the mounting base for rotation about the axis. The pulley comprises a bearing comprising an inner race, an outer race, and a rolling element between the inner race and the outer race, a cap retainer comprising a hollow neck configured to receive a bearing cap and a plate extending outward from the neck with the neck protruding upward from the plate, a continuous or discontinuous flange extending downward from the outer periphery of the plate, and a pulley body integrally molded to the bearing and the cap retainer. The cap retainer is positioned on the upper surface of the bearing with the plate adjacent to the upper surface and the flange adjacent to the outer surface of the outer race of the bearing.

In another aspect a method for molding a pulley is disclosed. The method includes providing an injection mold configured to form a pulley body, positioning a bearing comprising an inner race, an outer race, and a rolling element between the inner race and the outer race in the injection mold, positioning a cap retainer on an upper surface of the bearing, and injecting a resin into the injection mold to form a pulley body integrally molded to the bearing and the cap retainer. The cap retainer includes a hollow neck configured to receive a bearing cap and a plate extending outward from the neck with the neck protruding upward from the plate. The method may also include positioning a shield on the lower surface of the bearing before injecting the resin.

DETAILED DESCRIPTION

The new cap retainer and bearing cap disclosed herein eliminates the need to mold an additional feature into the pulley body to retain a bearing cap, which makes the mold and the molding process simpler. Another advantage of the cap retainer and bearing cap, depending upon the features used to attach the bearing cap to the cap retainer, is that the bearing cap is removable. The present cap retainer and bearing cap also make mold modifications minimal and should be universally useful for all pulley bodies.

Figure 1:
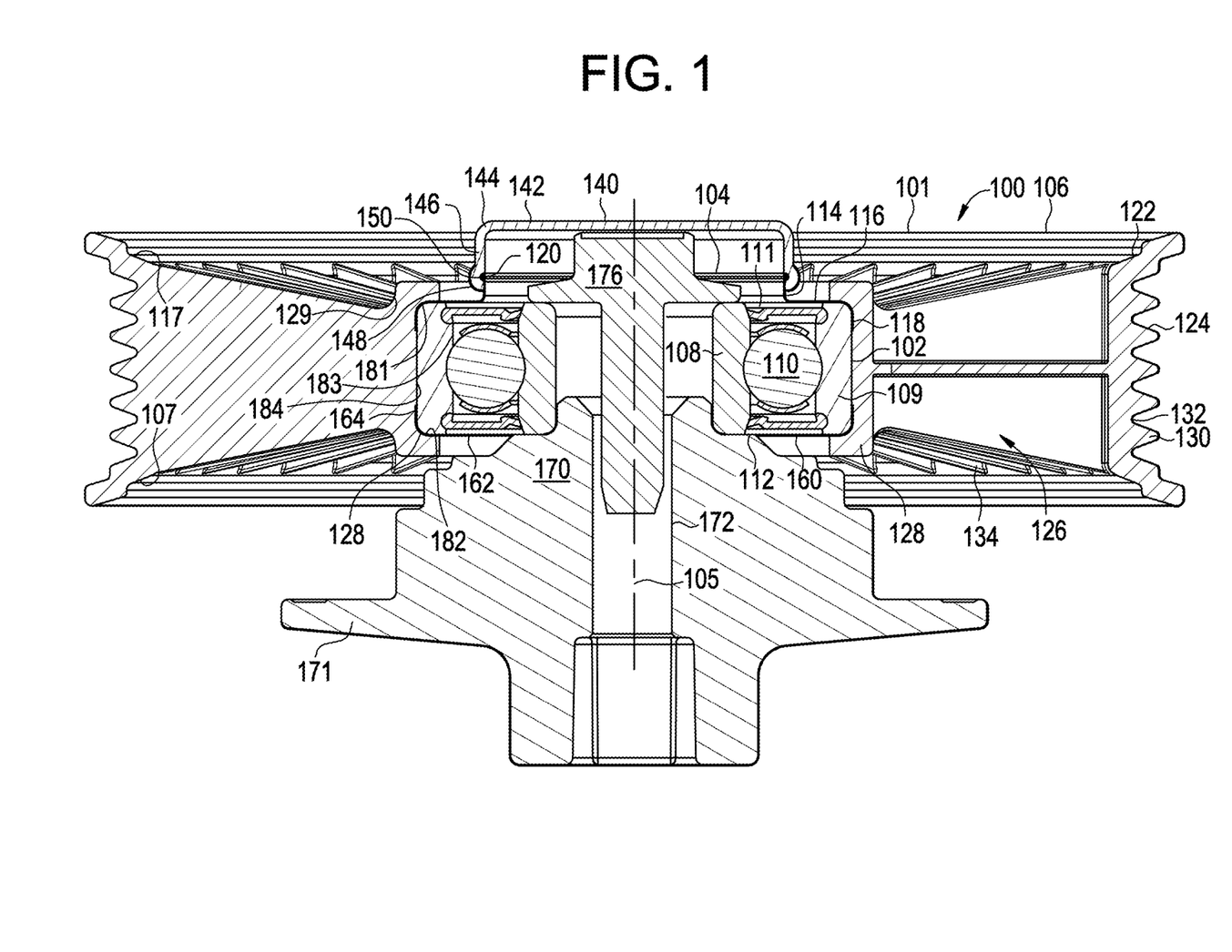
FIG. 1 is front, cross-section of one embodiment of a pulley assembly including a cap retainer and bearing cap.
Figure 2:
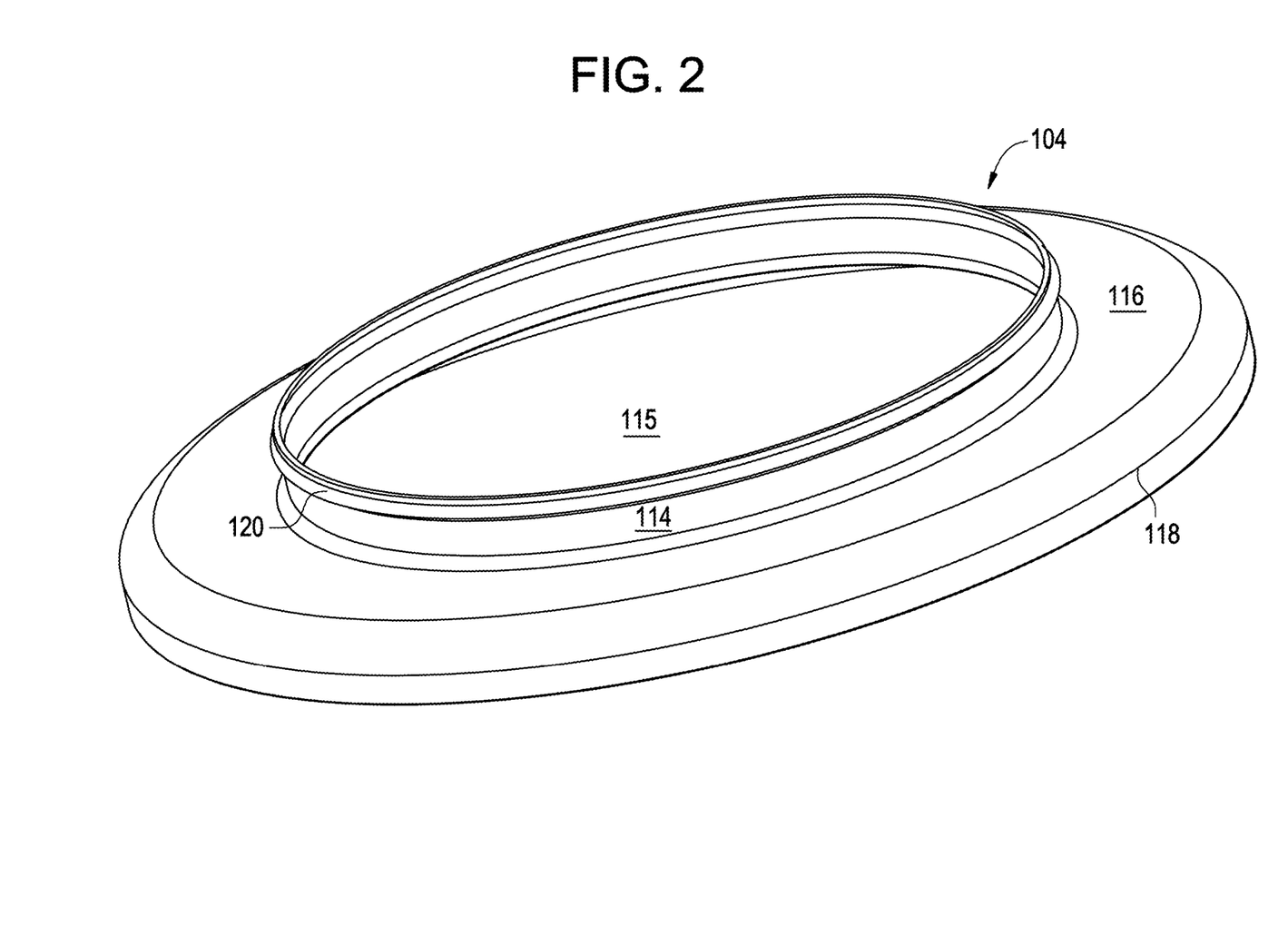
FIG. 2 is a front perspective view of one embodiment of the cap retainer of FIG. 1.
Figure 3A:
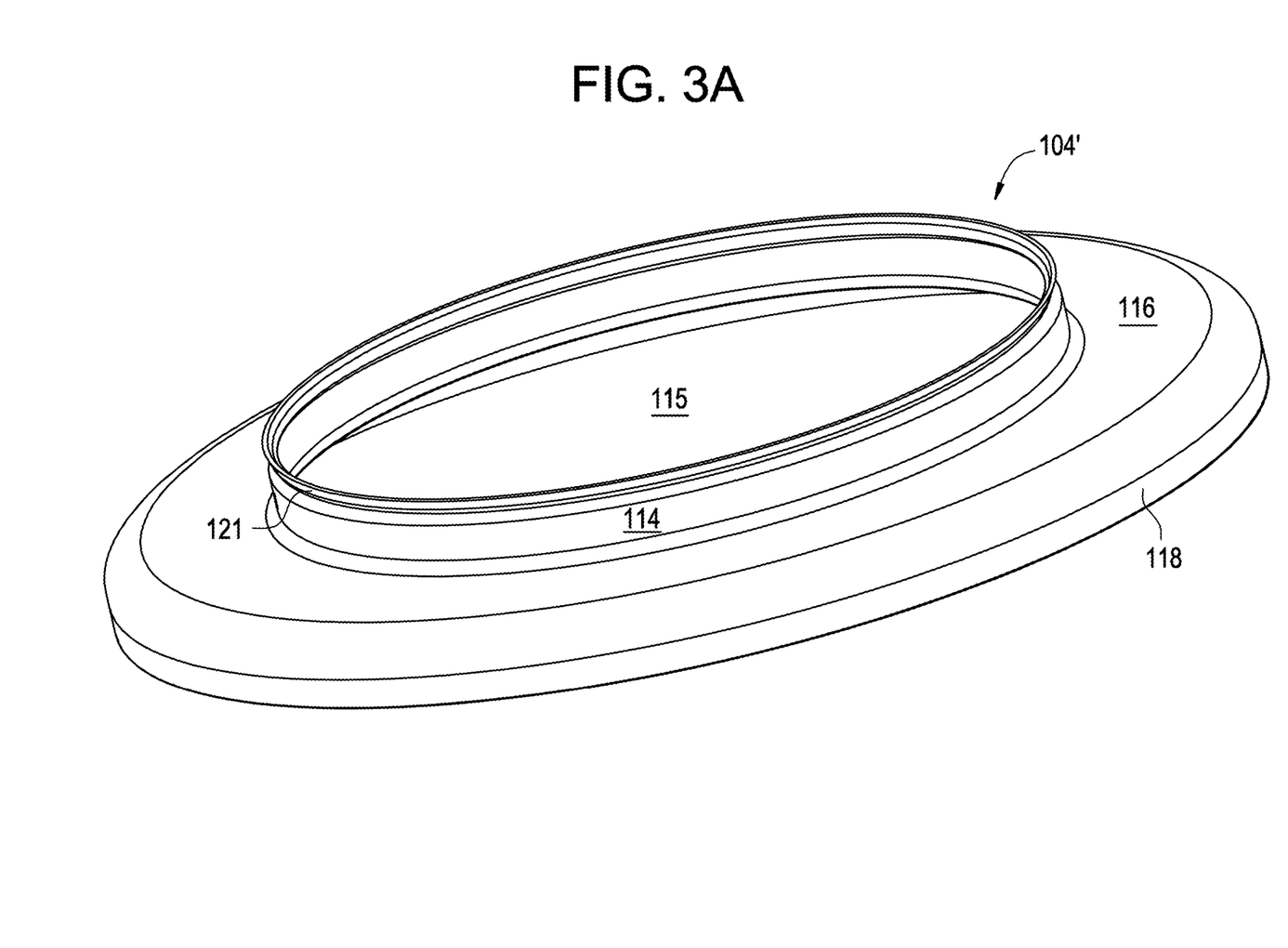
FIGS. 3A & 3B are front perspective views of alternate cap retainer embodiments having alternate inside-snap fit configurations.
Figure 3B:
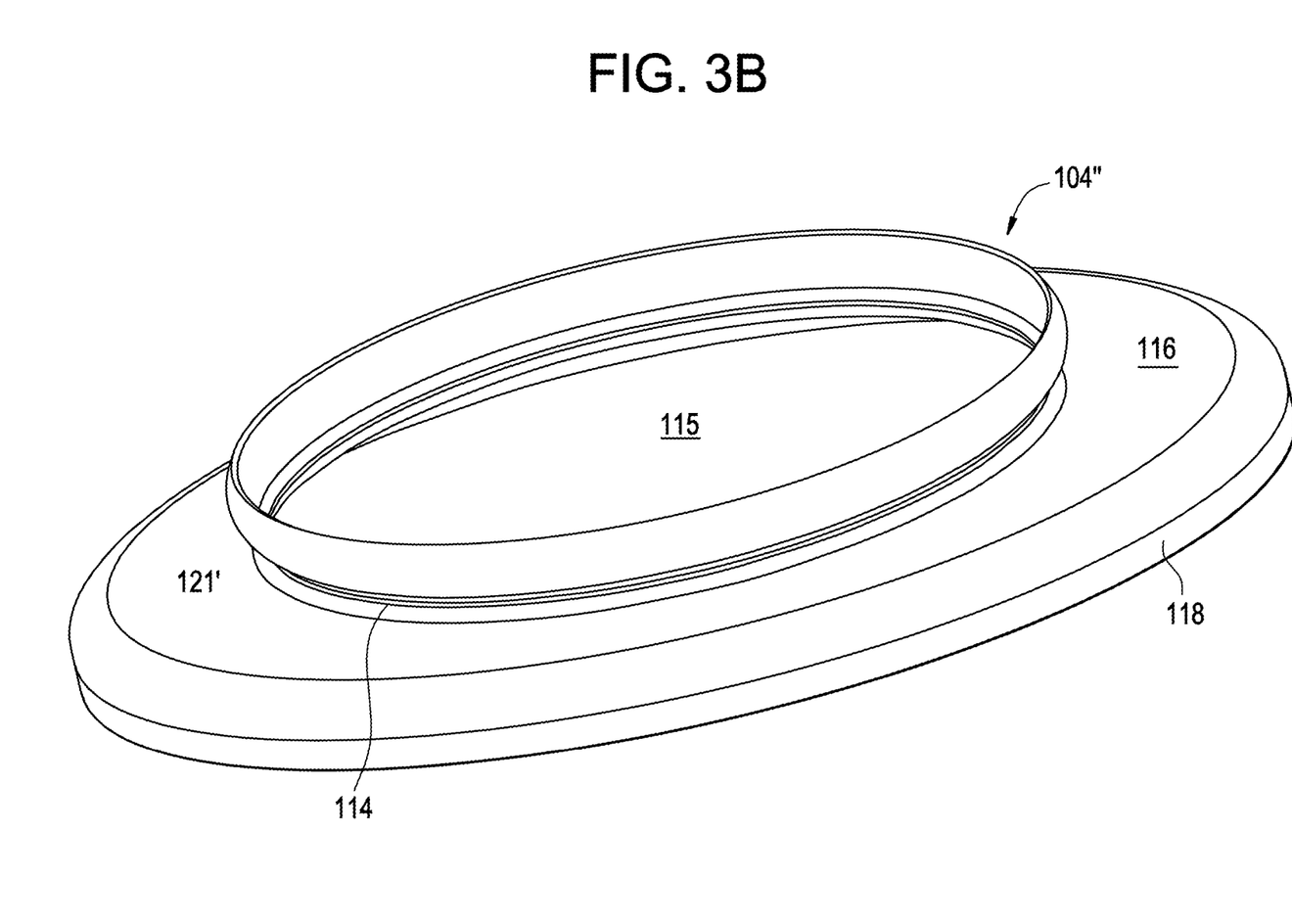

Referring now to the embodiment shown in FIG. 1, a pulley assembly, generally designated 100, is shown that includes a pulley 101 having an axis of rotation 105, a mounting base 170 for seating the pulley thereon, a cap retainer 104, a bearing cap 140, and a fastener 176. The pulley 101 is shown mounted to the mounting base 170 and generally contain an aperture 172 shaped to engage the fastener 176, such as a bolt to provide a clamping force and to aid in securing components of the pulley assembly together. The aperture in the pulley is typically centrally located and passes through a bearing 102 housed within an opening within the pulley body 106. As appreciated by one skilled in the art, the fastener 176 may also be a screw, pin, rivet, or other fasteners capable of providing the clamping force.

The pulley 101 is rotatable relative to the mounting base 170 about axis 105. Mounting base 170 may be disposed at one end of a tensioner arm 171 for tensioning a belt of a drive system, such as those disclosed in U.S. Pat. No. 5,190,502, No. 5,620,385, No. 6,863,631, but not limited thereto. The side of the pulley positioned on the mounting base 170 is referred to herein as the "arm side" 107 and the opposite side of the pulley is referred to as the "exposed side" 117. While the mounting base 170 is described for use with a belt tensioner, the application of the bearing cap and cap retainer is not limited thereto.

Pulley 101 includes a bearing 102, a cap retainer 104, a pulley body 106, and optionally an arm side shield 160 positioned on the arm side 117 opposite the cap retainer 104, and a bearing cap 140 connected to the cap retainer 104. The bearing 102 includes an inner race 108, an outer race 109, and one or more rolling elements 110 positioned between the inner and outer races and has an upper surface 111 and a lower surface 112. The bearing 102 may be a ball type bearing, a journal bearing, or a roller bearing, and may alternatively include other suitable roller elements 110, such as rollers or a cartridge. The outer race 109 has an upper surface 181, a lower surface 182, an inner surface 183, and an outer surface 184.

The cap retainer 104 is positioned on the upper surface 111 of the bearing 102 and the pulley body 106 is injection molded integrally to the bearing and the cap retainer, i.e., the bearing and cap retainer are insert molded. If an arm side shield 160 is present it may be positioned on the lower surface of the bearing 102 and may be insert molded at the same time as the cap retainer.

Pulley body 106 may include an outer ring 122 that includes a belt-running surface 124 for engaging a belt, such as an automotive power transmission belt, a core 126 that radially supports the outer ring 122 and a bearing housing portion 128 centrally located within the core. The bearing housing portion 128 may have a neck 129 that transitions the bearing housing portion 128 into the core 126.

The bearing 102 is located within the bearing housing portion 128 of the pulley body 106 such that the outer ring 122 including the belt-running surface 124, the core 126, the bearing housing portion 128, and the outer race 109 rotate together relative to the inner race 108. Core 126 may include a web of supports 134 extending outward from the central portion of the core.

The belt-running surface 124 may be generally flat or may have a textured surface, such as the non-limiting example of an undulating contour of peaks 130 separated by valleys 132 as shown in FIG. 1. The contour of the belt-running surface 124 is formed to correspond with a mating contour of a belt (not shown) that engages the belt-running surface during use. These mating contours can reduce slippage between the belt and the belt-running surface 124 during operation. As an alternative to undulations, the belt-running surface 124 may be formed for use with other input devices, such as a toothed belt, a V-shaped belt, etc.

Pulley body 106 may be formed by injection molding a material around an insert including the bearing 102, the cap retainer 104, and optionally arm side shield 160. The pulley body may be formed of one material or a plurality of materials. As used herein, "material" refers to the substance or substances out of which a thing is made and can refer to a mixture such as a composite including a filler disposed within a resin matrix. In one embodiment, it may be advantageous to form the pulley body from at least two distinct materials that can be selected to optimize certain physical properties of the pulley, such as wear resistance for the outer ring 122 and/or the belt-running surface 124 and compressive strength for the core 126 as taught in U.S. Published Patent Application 2006/0160647 to Swane. Suitable materials include, for example, polymers such as nylon 6, nylon 6/6, nylon 6/6/6 copolymer or blend, nylon 4/6, polypropylene, polyethylene, polystyrene, polyvinyl chloride, polyester, acetal, polyetherimide, polysulfone, polyphenylene sulfide, polyether sulfone, polyetheretherketone, polythalamide, and many other engineering plastics as appreciated by one of skill in the art, even those including fibers may be used.

Now referring to FIGS. 1-3B, cap retainers 104, 104', and 104" comprise a hollow generally cylindrical neck 114 configured to receive the bearing cap 140 and extending upward from a generally annular plate 116. The plate 116 extends radially outward from the base of the neck and has a flange 118 extending from the plate's outer periphery in a direction that is opposite from the direction the neck extends. The neck 114 defines an opening 115 that allows access to the bearing and receives the fastener 176. The neck 114 is shown as an annular neck, but is not limited thereto, as any other shape that enables the bearing cap 140 to be connected to the neck is possible. The neck 114 includes a feature or features to connect the bearing cap 140 to the neck. The feature may be an outside snap-fit projection 120 shown in FIGS. 1-2, an inside snap-fit feature 121 shown in FIG. 3A, or an inside snap-fit recess 121' shown in FIG. 3B.

Figure 4:
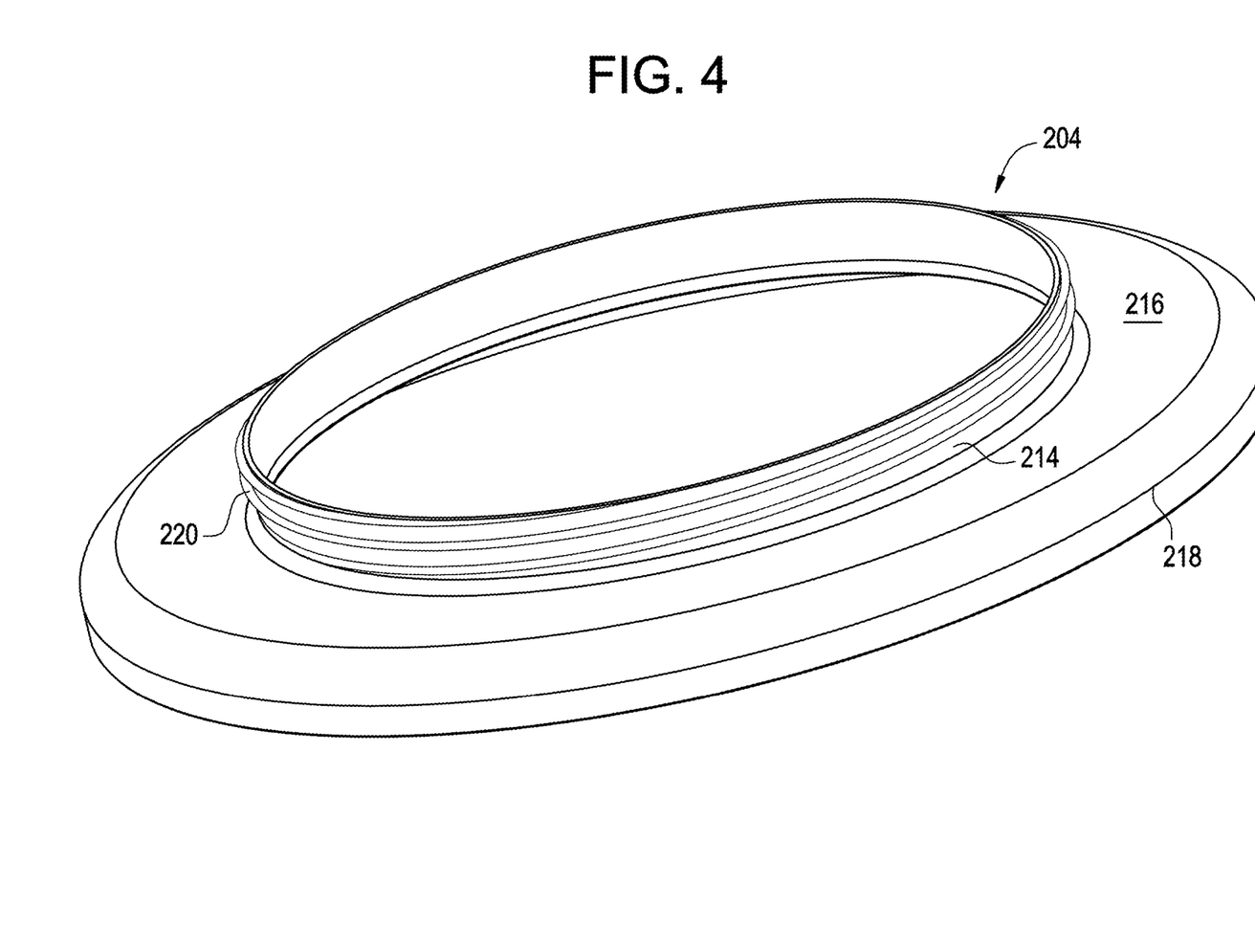
FIG. 4 is a front perspective view of another embodiment of the cap retainer.

Now referring to FIG. 4, another embodiment of the cap retainer, generally designated 204, is shown that include threads 220 as the feature(s) for connecting the bearing cap 140 to neck 214. The cap retainer 204 is configured similarly to those described above having a hollow generally cylindrical neck 214 extending upward from a generally annular plate 216. The plate 216 extends radially outward from the base of the neck 214 and has a flange 218 extending from the plate's outer periphery in a direction that is opposite from the direction the neck extends. Alternatively, one skilled in the art will appreciate that the bearing cap may be connected to the cap retainer by other means including but not limited to spot welding, spin welding, press fitting, latching, and deforming the outer flange of the bearing cap in response to pressing the center of the top of the bearing cap.

Figure 5:
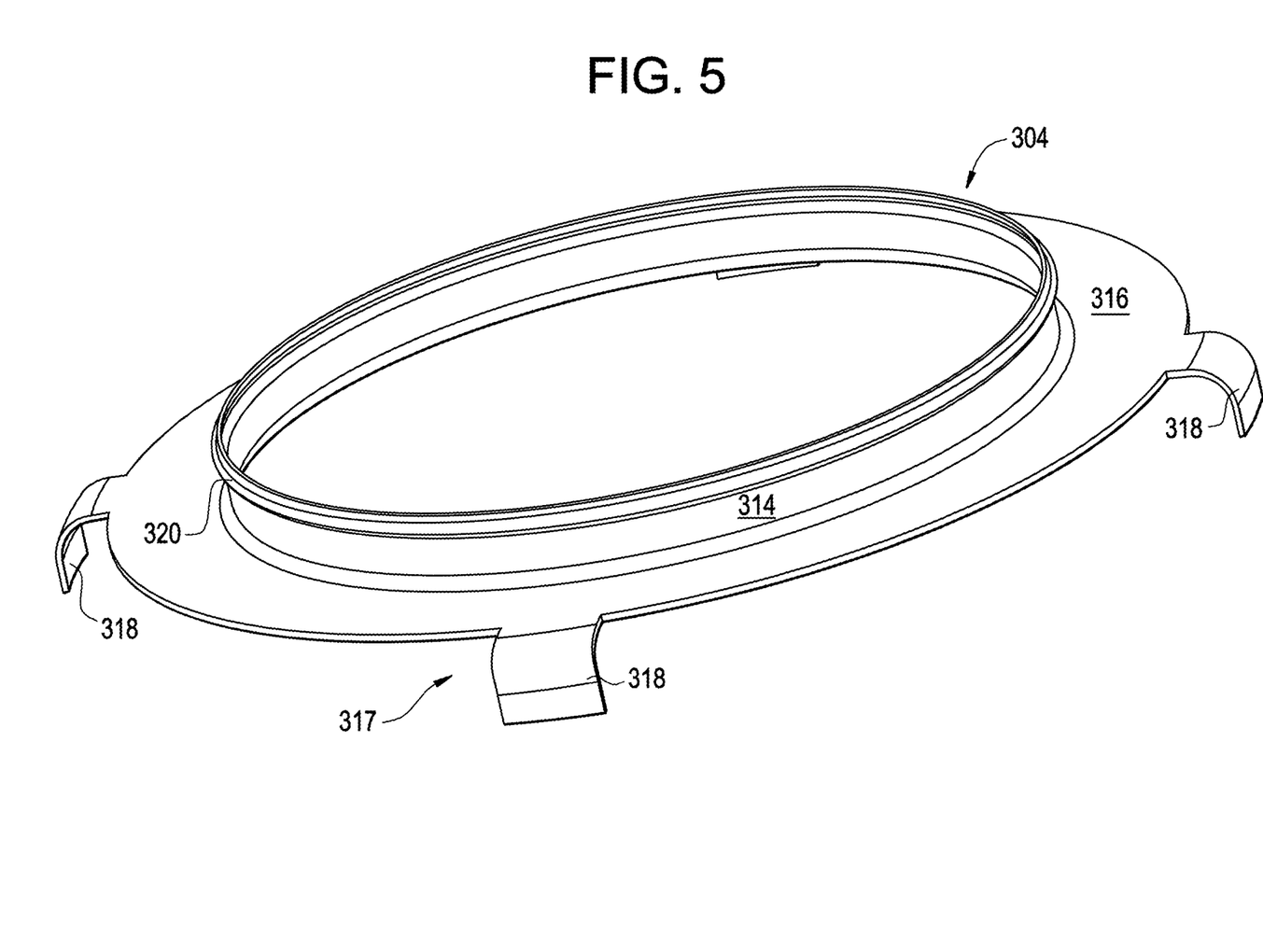
FIG. 5 is a front perspective view of another embodiment of a cap retainer.

Now referring to FIG. 5, another embodiment of a cap retainer, generally designated 304, is shown. Embodiment 304 includes a hollow generally cylindrical neck 314 extending upward from a generally annular plate 316. The plate 316 extends radially outward from the base of the neck 314. Embodiment 304 includes a discontinuous flange 317 extending from the outer periphery of plate 316 in a direction opposite from the neck 314. The neck 314 includes an outside snap-fit projection 320 for connecting to and retaining a bearing cap. Alternately, neck 314 may have an inside snap-fit projection, threading, latches, or other connecting means for retaining a bearing cap. The discontinuous flange 317 is illustrated as one or more downward extending tabs 318 spaced symmetrically about the periphery of the shoulder, but symmetrical placement of the tabs is not required. The tabs may be of various widths and shape and may be set at various spacing about the shoulder. The tabs provide enough contact with the bearing to hold the cap retainer in place while being insert molded and the openings separating the tabs provide more contact between the injection molded material of the pulley body and the outer race of the bearing. The contact between the pulley body and the outer race helps prevent the outer race from moving relative to the shell, i.e., prevents slipping of the bearing.

Regardless of the embodiment of the cap retainer it may be made of any suitable material or combinations of materials. Suitable materials may include metals, composites, plastics, or combinations thereof. Metal includes generally pure metals, metal alloys, and compositions containing metal or metal alloys. Plastics include injection molded plastics that are thermoset or thermoplastic.

The cap retainer may be formed by stamping, for example using progressive stamping techniques. In another embodiment, the cap retainer may be formed from powder metal by press and sintering techniques. In another embodiment, the cap retainer may be a molded piece.

When any of the various embodiments of the cap retainer are positioned on the bearing, the plate portion of the cap retainer is juxtaposed with the upper surface 181 of the outer race 109 and the flange portion is juxtaposed with the outer surface 184 of the outer race 109. The cap retainer and bearing are placed into a mold and the pulley body is molded thereto.

Figure 6:
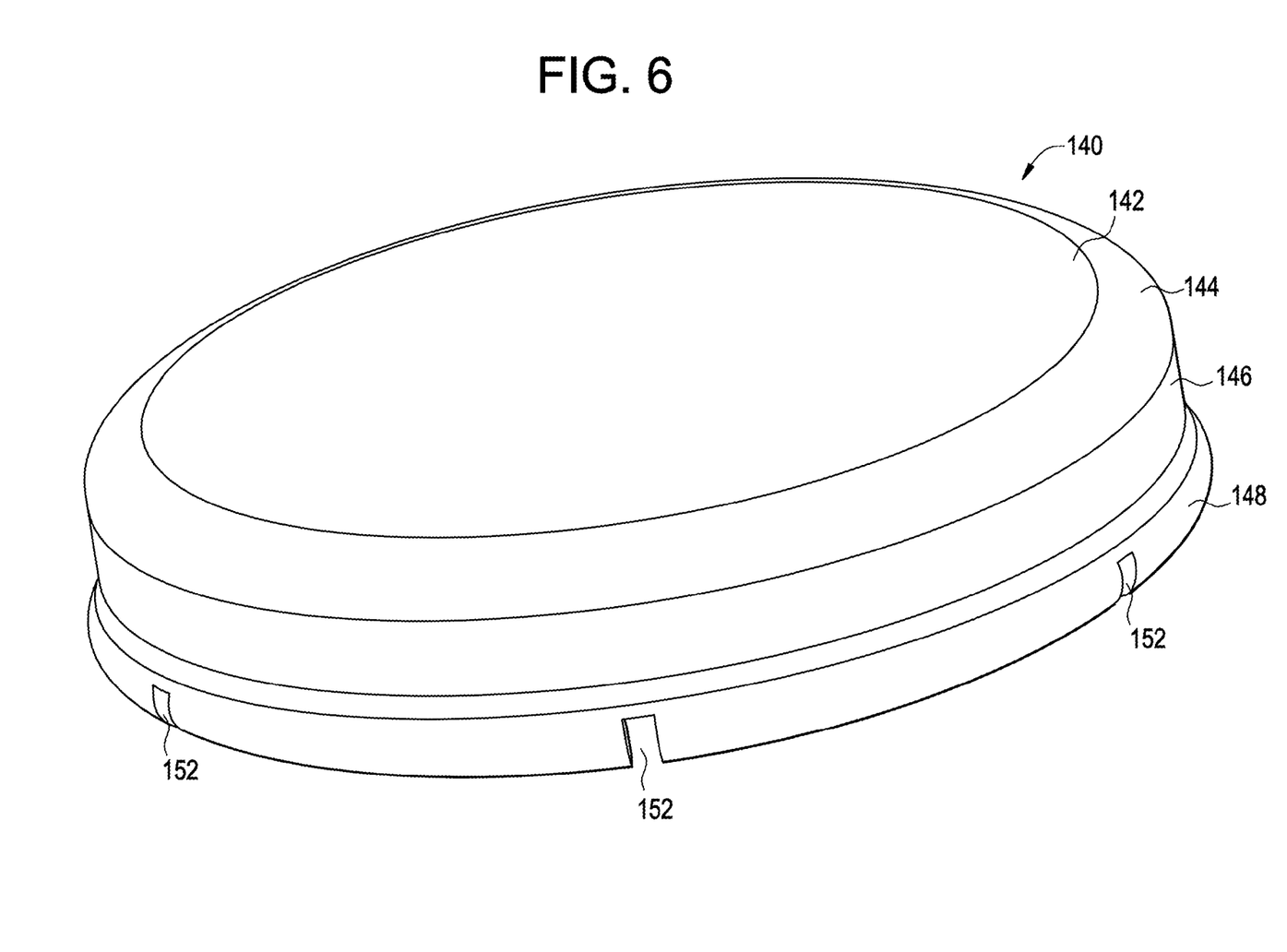
FIG. 6 is a front perspective view of one embodiment of the bearing cap of FIG. 1.
Figure 7:
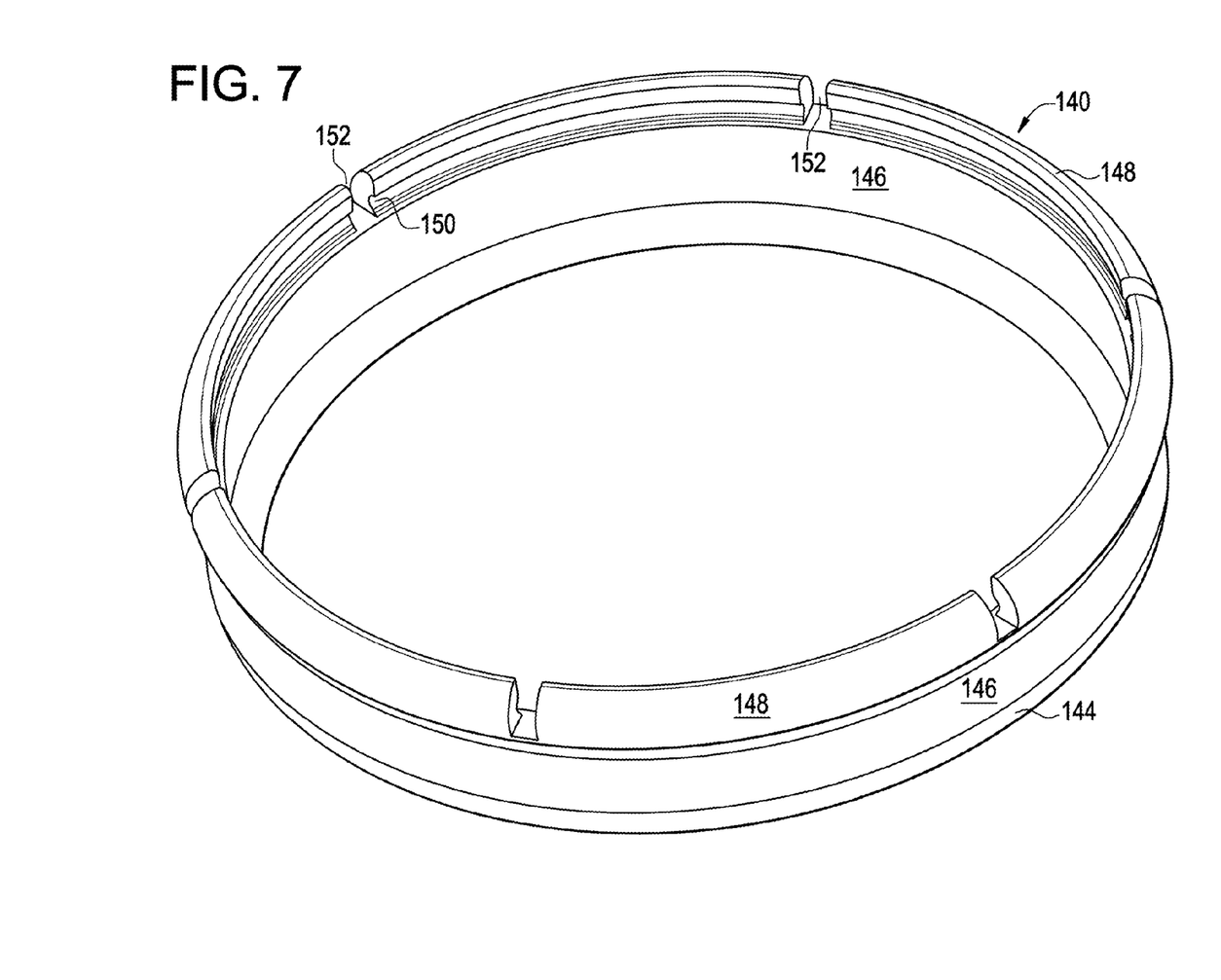
FIG. 7 is a bottom perspective view of the bearing cap of FIG. 6.

Now referring to FIGS. 1 and 6-7, bearing cap 140 generally includes a top 142 having one or more sidewalls 146 and optionally may include a shoulder 144 that transitions the top 142 into the one or more sidewalls. The bearing cap 140 may also include a rim 148 at the end of the sidewall 146 opposite where it connects to top 142 or shoulder 144.

Bearing cap 140 includes appropriate feature(s) on the interior or exterior of the sidewall 146 or rim 148 to connect it to the neck 114 of the cap retainer 104. In the case of spot welding or spin welding the bearing cap 140 to neck 114, no such features may be needed. However, if the cap retainer's neck 114 includes an inside or an outside snap-fit feature, then the bearing cap 140 on the interior or exterior of the sidewall 146 or the rim 148 will have a snap-fit connector 150 configured appropriately to mate with the snap-fit feature present on the neck, such as the outside snap-fit connector shown in FIG. 7. Likewise, if neck 114 is threaded, then the bearing cap 140 will be configured to screw onto the neck. In another embodiment, the bearing cap may include latches to connect to neck 114, if so then the neck will include whatever hooking means is needed to secure the latch (not shown). In another embodiment, the bearing cap 140 may be configured to deform to secure the sidewall or rim of the neck 114 in response to pressing the center of its top. If such a bearing cap is utilized, the neck of the cap retainer should include a lip designed to receive and retain the end of the sidewall or the rim. One skilled in the art will appreciate that the bearing cap may include a combination of features to secure the bearing cap to the cap retainer's neck.

Bearing cap 140 may be made of any suitable material or combinations of materials, such as metals or plastics, including injection molded plastics. A molded bearing cap 140, such that shown in FIGS. 6 and 7, may include one or more slots 152 in rim 148, or alternately the edge of the sidewall 146 if no rim is present. The slots 152 may be present to enable a tool to eject the molded bearing cap from a mold.

Figure 9:
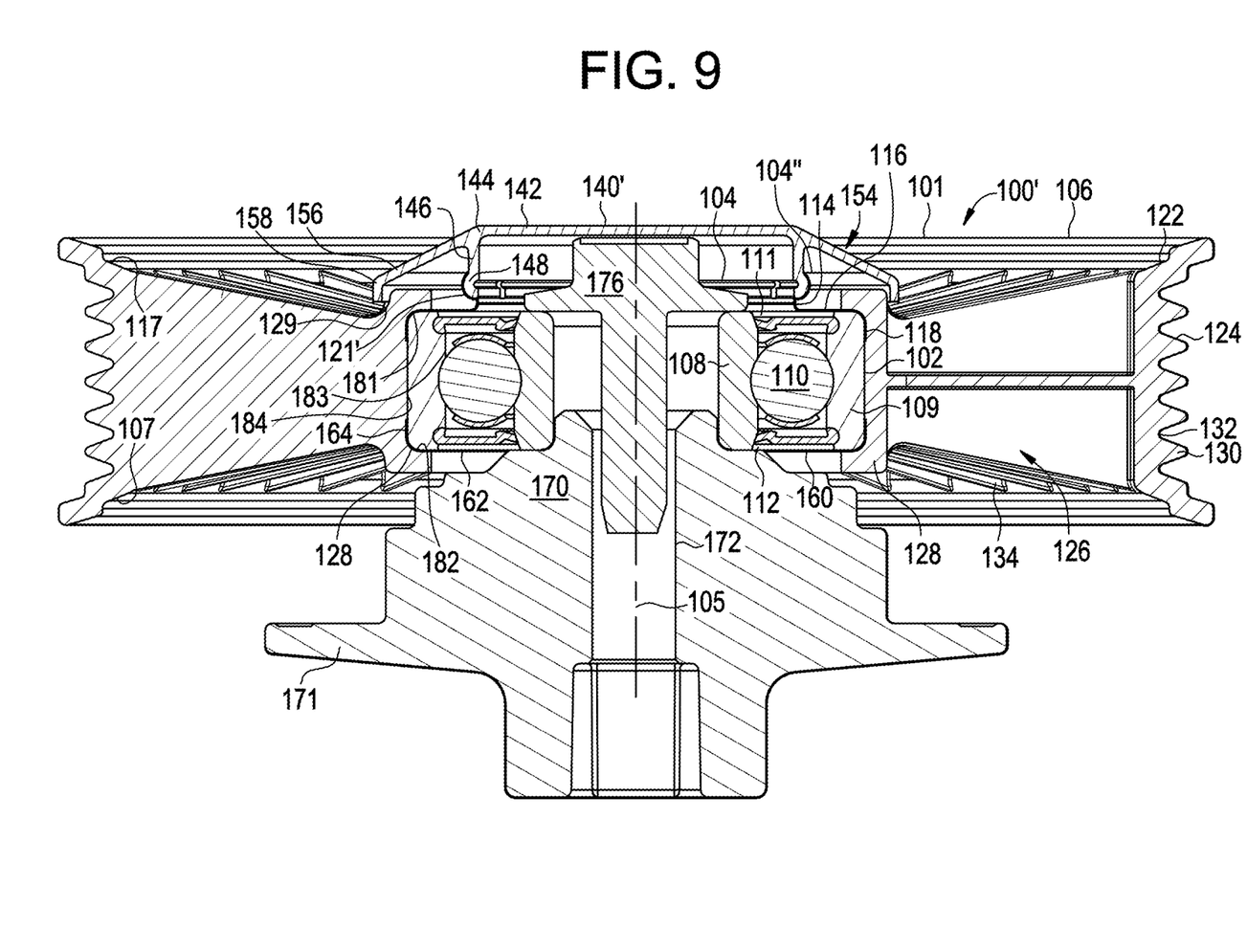
FIG. 9 is a front, cross-section of another embodiment of a pulley assembly including an alternate embodiment for the bearing cap.
Figure 10A:
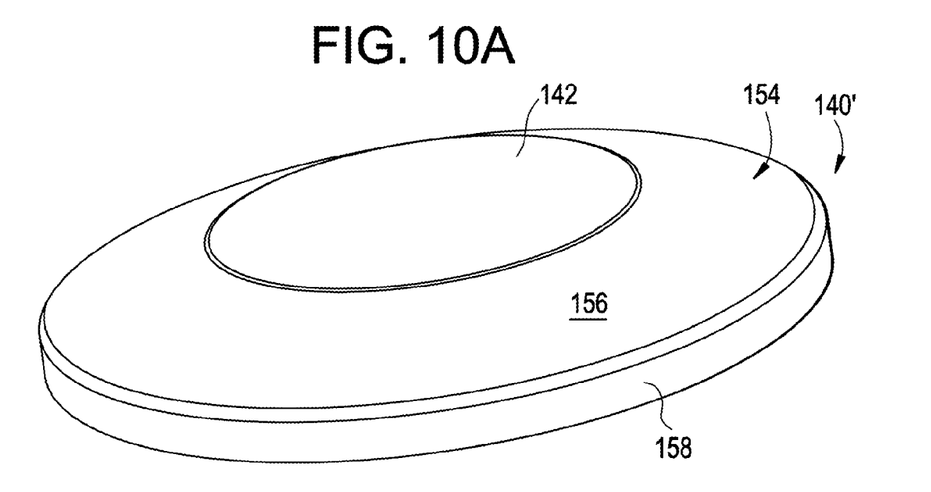
FIGS. 10A and 10B are top and bottom perspective views of the bearing cap of FIG. 9.
Figure 10B:
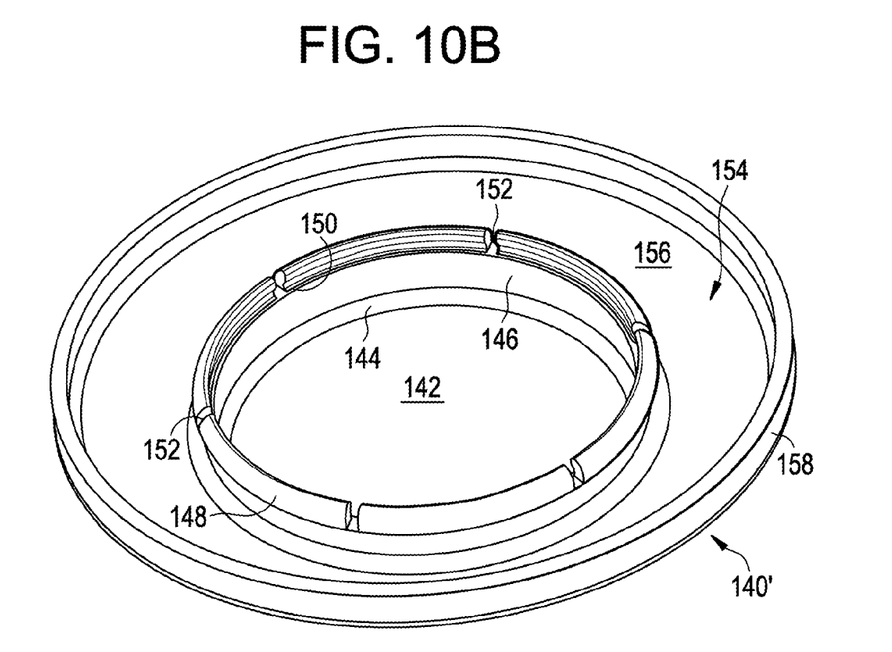

In another embodiment, bearing cap 140 may include an umbrella 154 as shown in FIGS. 9 and 10A-10B. This umbrella bearing cap is generally designated 140'. In FIG. 9, bearing cap 140' is shown as part of a pulley assembly general designated 100' that contains a pulley 101 having an axis of rotation 105, a mounting base 170 for seating the pulley thereon, a cap retainer 104", and a fastener 176. Other than the alternate cap retainer 104" and bearing cap 140' the other components and features of pulley assembly 100' are the same as FIG. 1 with corresponding reference numbers. Those components and features of the bearing cap 140' that are the same as the bearing cap 140 have corresponding reference numbers.

Bearing cap 140' generally includes a top 142 having one or more sidewalls 146 and optionally may include a shoulder 144 that transitions the top 142 into the one or more sidewalls and transitions into a cover 156 portion of umbrella 154. The bearing cap 140 may also include a rim 148 at the end of the sidewall 146 opposite where it connects to top 142 or shoulder 144. Umbrella 154 includes cover 156 extending outward from the top 142 and/or shoulder 144 of the bearing cap. Cover 156 may extend outward and downward at an angle sloping away from the top 142, which will direct the umbrella 154 toward the pulley body 106, but is not limited thereto, and may be configured to extend beyond the portion of the pulley body 106 that forms the bearing housing portion 128. A flange 158 may be included that extends from cover 156 at an end opposite where the cover connects to the top 142 with the flange extending downward from the outer periphery of the cover 156, which directs the flange toward the pulley body. As shown in FIG. 9, cover 156 extends beyond the bearing housing portion 128 with flange 158 positioned past the neck 129 of the bearing housing portion 128 of the pulley body 106 to form a second line of defense against contaminants. Flange 158 may form a labyrinth seal. In one embodiment, the pulley body 106 may include a groove in the exposed side 117 of the pulley body 106 to receive the flange 158 to form the labyrinth seal or to form a contact seal.

In FIG. 9, bearing cap 140' is shown connected to cap retainer 104" where the inside snap-fit recess 121' of cap retainer 104" (FIG. 3B) received the outer portion of rim 148 of bearing cap 140'. As shown in FIG. 9, rim 148 may be configured with a hook-shaped snap-fit connector 150 for use with a cap retainer having an outside snap-fit configuration. Bearing cap 140' may also include one or more slots 152 in rim 148, best seen in FIGS. 10A-10B.

Figure 8A:
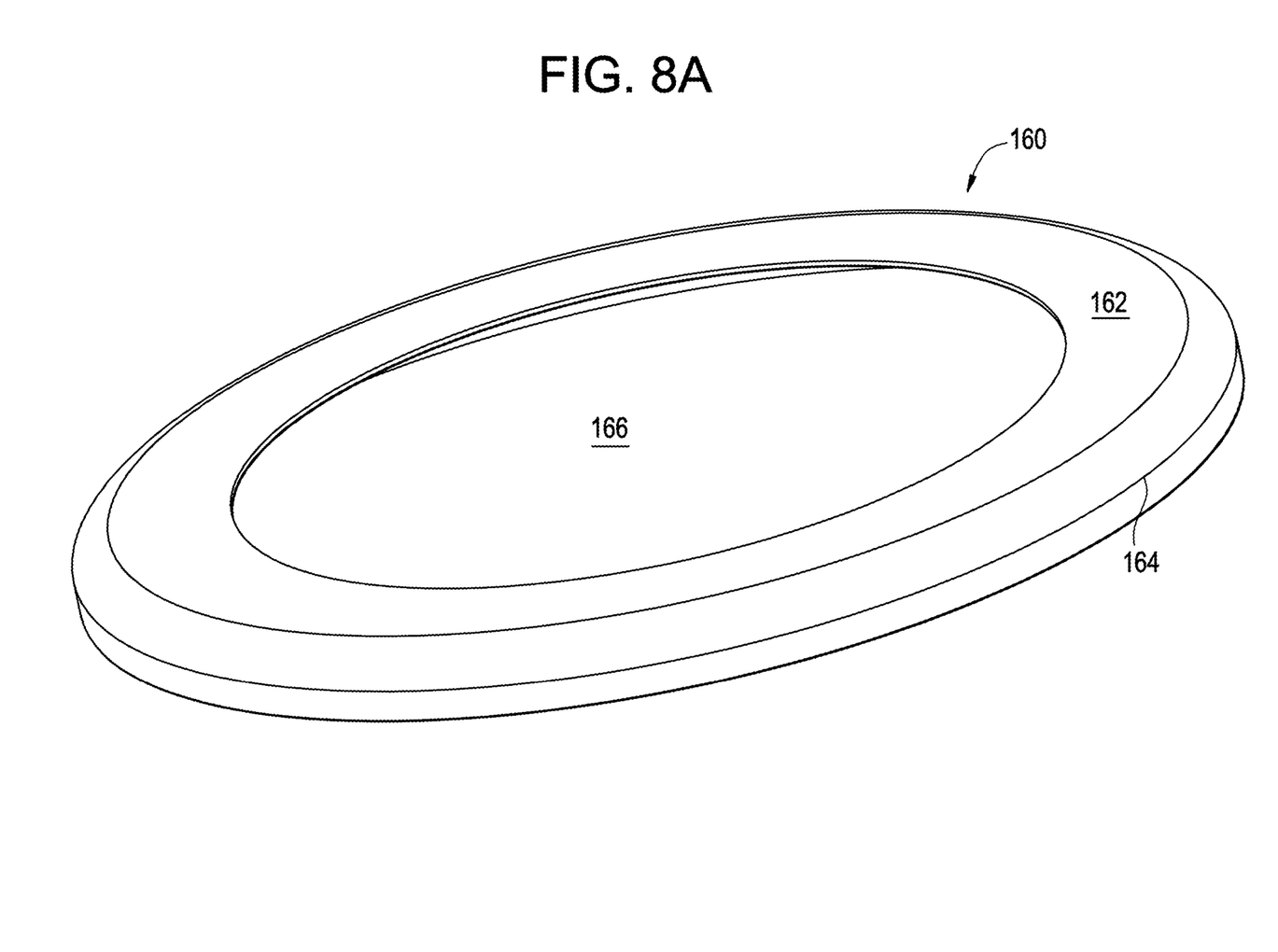
FIGS. 8A and 8B are front perspective views of two embodiments of the bearing shield of FIG. 1.

Now referring to FIGS. 1 and 9, pulley 101 may include an arm side shield or 160' positioned on the lower surface 112 of the bearing 102 to shield the bearing from dust and other contaminants. Arm shield 160 includes an annular plate 162 and a continuous flange 164. While arm side shields 160, 160' are shown in more detail in FIGS. 8A and 8B, one skilled in the art will appreciate that other configurations for a shield may be used. Arm side shield 160, shown in FIG. 8A, comprises a generally annular plate 162 defining a generally central opening 166 and has a continuous flange 164 extending generally downward away from the outer periphery of the plate 162. Opening 166 may receive the mounting base 170 of the tensioner arm and should be sized to provide the appropriate clearance. The arm side shield 160 may be positioned on the bearing 102 so the plate 162 lies adjacent the lower surface 112 of the bearing and the flange 164 extends over the side of the bearing to lie adjacent to the outer surface of the bearing's outer race 109.

Figure 8B:
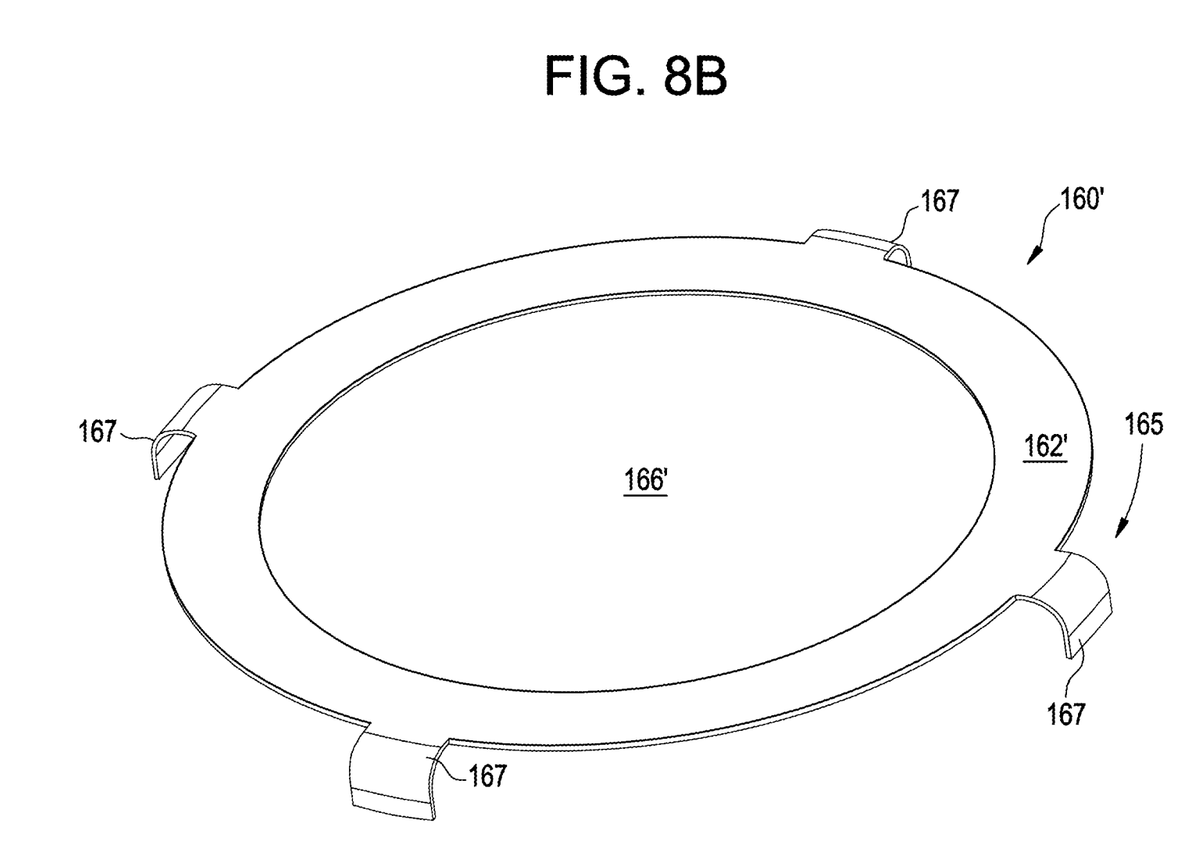

An alternate embodiment for the arm side shield, generally designated arm side shield 160', is shown in FIG. 8B. The arm side shield 160' includes a generally annular plate 162' defining a generally central opening 166' and has a discontinuous flange 165 comprising tabs 167 similar to the flange and tabs described above for cap retainer 304 in FIG. 5. The arm side shields 160, 160' may be made of the same material(s) as the cap retainer.

The embodiments of this invention shown in the drawing and described above are exemplary of numerous embodiments that may be made within the scope of the appended claims. It is contemplated that numerous other configurations of the tensioner assemblies may be created taking advantage of the disclosed approach. In short, it is the applicant's intention that the scope of the patent issuing herefrom will be limited only by the scope of the appended claims.

What is claimed is:

1. A method for assembling a pulley assembly, the method comprising:
    providing an injection mold configured to form a pulley body;
    positioning a bearing comprising an inner race, an outer race, and a rolling element between the inner race and the outer race in the injection mold;
    positioning a cap retainer on an upper surface of the bearing, the cap retainer comprising a hollow neck configured to receive a bearing cap and a plate extending outward from the neck with the neck protruding upward from the plate, wherein the neck defines an opening that allows for access to the bearing, and the neck defines at least one feature to connect the bearing cap to the neck; and
    injecting a resin into the injection mold to form a pulley body integrally molded to the bearing and the cap retainer.

2. The method of claim 1 wherein the cap retainer further comprises a continuous or discontinuous flange extending downward from the outer periphery of the plate.

3. The method of claim 2 wherein the plate is adjacent to the upper surface of the bearing and the flange is adjacent to an outer surface of the outer race of the bearing.

4. The method of claim 1 further comprising positioning a shield on a lower surface of the bearing before injecting the resin, the shield comprising a plate having a generally central opening and having a continuous or discontinuous flange extending from the outer periphery of the plate, wherein the plate is adjacent the lower surface of the bearing and the flange is adjacent an outer surface of the outer race of the bearing.

* * * * *